(12) United States Patent
Berger et al.

(10) Patent No.: US 10,120,111 B2
(45) Date of Patent: Nov. 6, 2018

(54) THIN CERAMIC IMAGING SCREEN FOR CAMERA SYSTEMS

(71) Applicant: Google LLC, Mountain View, CA (US)

(72) Inventors: Jill D. Berger, Saratoga, CA (US);
Steven M. Swain, San Jose, CA (US);
Tianran Liang, Santa Clara, CA (US);
Kevin Y. Yasumura, Lafayette, CA (US)

(73) Assignee: Google LLC, Mountain View, CA (US)

( * ) Notice: Subject to any disclaimer, the term of this patent is extended or adjusted under 35 U.S.C. 154(b) by 32 days.

(21) Appl. No.: 15/379,186

(22) Filed: Dec. 14, 2016

(65) Prior Publication Data

US 2018/0164476 A1    Jun. 14, 2018

(51) Int. Cl.
*G02B 5/02* (2006.01)
*H04N 5/374* (2011.01)
*H04N 5/225* (2006.01)
*C03C 17/00* (2006.01)
*G02B 6/35* (2006.01)

(52) U.S. Cl.
CPC .......... *G02B 5/0268* (2013.01); *C03C 17/007* (2013.01); *G02B 5/0242* (2013.01); *G02B 5/0278* (2013.01); *G02B 6/359* (2013.01); *H04N 5/2252* (2013.01); *H04N 5/374* (2013.01); *C03C 2217/452* (2013.01); *C03C 2217/485* (2013.01); *G02B 6/356* (2013.01); *G02B 6/3512* (2013.01); *G02B 6/3556* (2013.01)

(58) Field of Classification Search
CPC .................................................. G02B 5/0268
See application file for complete search history.

(56) References Cited

U.S. PATENT DOCUMENTS

| 5,713,333 A | * | 2/1998 | Cooper | F02M 41/06 |
| | | | | 123/450 |
| 7,034,271 B1 | * | 4/2006 | Sinclair | G02B 21/0016 |
| | | | | 250/201.3 |
| 9,546,974 B2 | * | 1/2017 | Wu | C12Q 1/005 |
| 2004/0115352 A1 | | 6/2004 | Schultheis et al. | |

(Continued)

FOREIGN PATENT DOCUMENTS

| EP | 2383236 A1 | | 11/2011 | |
| JP | 2011230965 A | * | 11/2011 | H01L 33/04 |
| WO | 2005052071 A1 | | 6/2005 | |

OTHER PUBLICATIONS

JP 2011230965 A; Glass Ceramic Composition and Element Mounting Substrate; Asahi Glass; Nov. 2011; English Translation; Abstract.*

(Continued)

*Primary Examiner* — Roberto Velez
*Assistant Examiner* — Cynthia Segura
(74) *Attorney, Agent, or Firm* — McDermott Will & Emery LLP

(57) ABSTRACT

An apparatus and a camera system are provided. The apparatus includes an imaging screen configured to diffuse incoming light, and a lens system coupled to the imaging screen and configured to focus light from the imaging screen onto a CMOS image sensor. The imaging screen includes a ceramic diffuser layer fused into a surface of a glass substrate, and a thickness of the ceramic diffuser layer is within a range of about 7-10 μm.

20 Claims, 4 Drawing Sheets

(56) References Cited

U.S. PATENT DOCUMENTS

| | | | |
|---|---|---|---|
| 2006/0088317 A1* | 4/2006 | Ishii | G02B 6/3588 398/19 |
| 2006/0171033 A1* | 8/2006 | Schreder | B29D 11/00 359/566 |
| 2008/0240716 A1 | 10/2008 | Davis et al. | |
| 2009/0146564 A1* | 6/2009 | Bae | H01J 9/261 313/582 |
| 2009/0152664 A1* | 6/2009 | Klem | H01L 27/14603 257/440 |
| 2012/0244318 A1* | 9/2012 | Koyo | G02B 1/113 428/149 |
| 2013/0139878 A1* | 6/2013 | Bhatnagar | H01L 31/022466 136/256 |
| 2013/0279007 A1* | 10/2013 | Kawai | C03C 17/3417 359/586 |
| 2014/0300739 A1* | 10/2014 | Mimar | H04N 7/188 348/148 |
| 2014/0329022 A1* | 11/2014 | Otani | G02B 1/111 427/485 |
| 2015/0015638 A1 | 1/2015 | Shipway et al. | |
| 2015/0077966 A1* | 3/2015 | Bessho | G02B 5/0242 362/19 |
| 2015/0097166 A1 | 4/2015 | Setz et al. | |
| 2015/0116275 A1* | 4/2015 | Kanehira | G06F 3/042 345/175 |
| 2015/0116276 A1* | 4/2015 | Izukawa | G06F 3/0423 345/175 |
| 2015/0260984 A1* | 9/2015 | Yamakawa | H04N 9/3129 345/591 |
| 2015/0323711 A1* | 11/2015 | Bessho | G02B 5/0242 349/71 |
| 2017/0160446 A1* | 6/2017 | Nonaka | G02B 5/0242 |
| 2017/0212283 A1* | 7/2017 | Tsai | G02B 5/0242 |
| 2017/0329057 A1* | 11/2017 | Takahagi | G02B 5/021 |
| 2018/0001339 A1* | 1/2018 | Otani | G02B 1/111 |
| 2018/0101253 A1* | 4/2018 | He | B32B 17/10018 |

OTHER PUBLICATIONS

Extended European Search Report dated Apr. 9, 2018 in European Patent Application No. 17199276.1.

* cited by examiner

THIN CERAMIC IMAGING SCREEN FOR CAMERA SYSTEMS

TECHNICAL FIELD

The present description relates generally to camera systems, and more particularly, but not exclusively, to a thin ceramic imaging screen for camera systems.

BACKGROUND

Optical circuit switches (OCSs) are the heart of optical circuit switching networks. An OCS includes a number of optical collimators which direct optical signals into and out of optical fibers coupled to the OCS. The OCS further includes a mirror array which can be a micro-electro-mechanical system (MEMS) based micro-mirror array that can selectively direct optical beams from individual optical fibers coupled to input collimators to selected optical fibers coupled to output collimators. The MEMS mirror angles required for optimal fiber coupling efficiency between input and output optical fibers can be monitored and corrected using a control system, including a camera system that monitors light reflecting off the mirrors of the MEMS mirror array.

SUMMARY

According to various aspects of the subject technology, an apparatus and a camera system are provided. The apparatus includes an imaging screen configured to diffuse incoming light, and a lens system coupled to the imaging screen and configured to focus light from the imaging screen onto a CMOS image sensor. The imaging screen includes a ceramic diffuser layer fused into a surface of a glass substrate, and a thickness of the ceramic diffuser layer is within a range of about 7-10 µm. A thermal expansion coefficient (CTE) of the ceramic diffuser layer has a value within about 8% of a CTE value of the glass substrate.

According to another aspect of the subject technology, the camera system is used for monitoring micro electro-mechanical system (MEMS) mirrors. The camera system includes a diffuser that has a ceramic diffuser layer fused into a first surface of a glass substrate. The camera system further includes an imaging lens to focus light transmitted by the diffuser, and an image sensor to receive focused light from the imaging lens and to generate electrical signals. A processor is coupled to the image sensor and is configured to produce an image of beams reflected from the MEMS mirrors based on the electrical signals.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

Disclosed herein are an apparatus and a camera system. In some implementations, the camera system may be used to monitor positions of MEMS mirrors of an optical circuit switch. In one or more aspects of the subject technology, an apparatus including a fused glass/ceramic imaging screen for a camera system is provided. According to some aspects, the apparatus includes an imaging screen configured to diffuse incoming light, and a lens system coupled to the imaging screen, configured to focus light from the imaging screen onto a CMOS imaging sensor. The imaging screen includes a ceramic diffuser layer fused into a glass substrate. The thickness of the ceramic diffuser layer after thermal processing is within a range of about 7-10 µm.

In some implementations, the ceramic diffuser layer, before the thermal processing, comprises a printed layer comprising ink material. The printed ceramic material can be a white ink containing a bismuth based glass frit and an inorganic white pigment with main components including silicon dioxide ($SiO_2$), zinc oxide (ZnO), diboron trioxide ($B_2O_3$), sodium oxide ($Na_2O$), and bismuth oxide ($BiO_2$).

The imaging screen includes the printed layer fused into the glass substrate after, for example, drying and kiln firing at a temperature within the range of 650-700 degrees C. The glass substrate can include soda-lime float glass, and the thermal expansion coefficient (CTE) of the ceramic diffuser layer can have a value that is within about 8% of the CTE value of the glass substrate. The apparatus may further include a stainless steel housing embracing the imaging screen. The value of the glass substrate can be within about 7% of the CTE value of the stainless steel housing.

In one or more implementations, the imaging screen is configured to be thermally stable within a predefined operating temperature range (e.g., about −55 to about 150 degrees C.) to enable thermal stability of pixel-to-pixel separation of an image formed on the CMOS sensor. The imaging screen can be configured to withstand predefined environmental conditions including a predefined temperature range (e.g., about −55 to about 150 degrees C.), a predefined humidity range (e.g., 95% relative humidity), and exposure to boiling water, ultraviolet light, and one or more environmental chemicals.

Figure 1A:
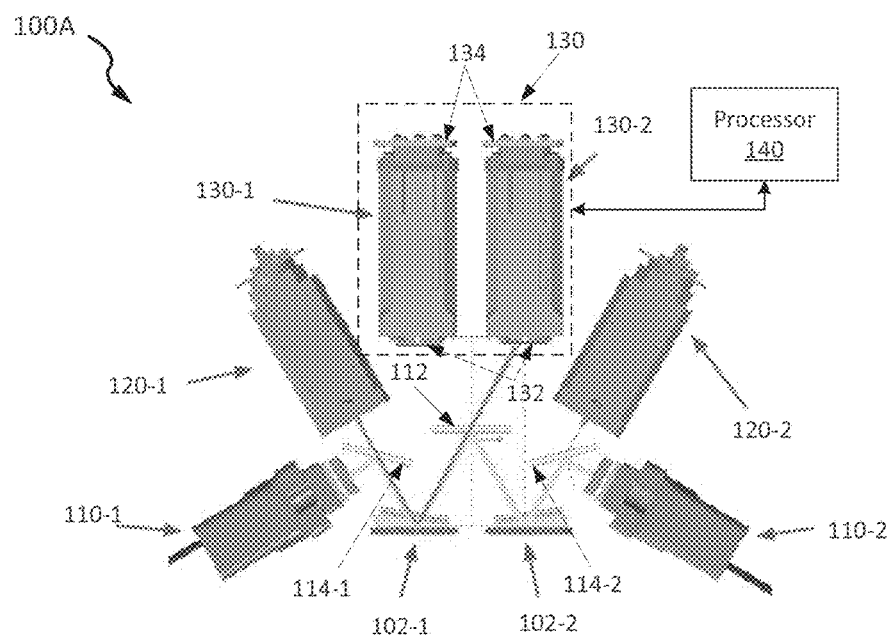
FIGS. 1A-1B are diagrams illustrating an example configuration of an optical circuit switch (OCS) using a camera system, and an example imaging screen assembly of the camera system, in accordance with one or more aspects of the subject technology.
Figure 1B:
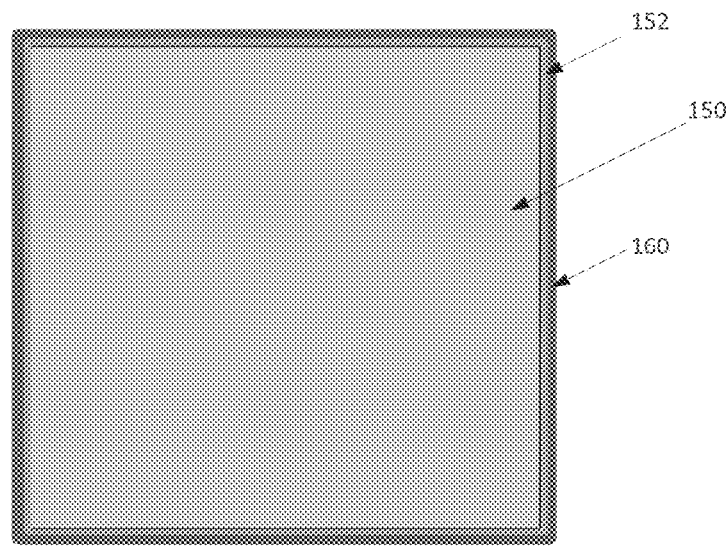

FIGS. 1A-1B are diagrams illustrating an example configuration of an optical circuit switch (OCS) 100A using a camera system and an example imaging screen 100B of the camera system, in accordance with one or more aspects of the subject technology. The OCS 100A is an optical circuit switch providing an optical switching matrix. The OCS 100A includes a first collimator 110-1 and a second collimator 110-2 (generally collimators 110) and mirror arrays 102-1 and 102-2 (generally mirror arrays 102). Each mirror array 102 includes multiple (e.g., between about 128 and 1000) mirrors. The OCS 100A also includes injectors 120-1 and 120-2 (generally injectors 120) and a camera system 130, including cameras 130-1 and 130-2 (generally cameras 130) including imaging screens 132 in the front end of the cameras 130 and CMOS sensors 134 attached to a printed circuit board. The input collimator 110-1 may include multiple passive collimators that are coupled to a number N (e.g., in the range of about 128-1000) of optical fibers.

Input light enters the collimators 110 through the optical fibers. The light transmitted through each optical fiber includes one or more optical wavelengths ($\lambda_i$). Output light from the collimators 110 is provided to a set of optical fibers, each carrying light at the one or more optical wavelengths ($\lambda_i$). The collimators 110-1 and 110-2 can be structurally similar. In general, optical signals received through the collimator 110-1 are directed out of the collimator 110-2, and light received through the collimator 110-2 is directed out of the collimator 110-1. The mirror arrays 102 are micro-electro-mechanical system (MEMS) based micro-mirror arrays that can selectively direct optical beams from individual optical fibers coupled to collimator 110-1 to selected optical fibers coupled to the collimators 110-2 and vice versa.

Each of the MEMS-based micro-mirror arrays (hereinafter "MEMS array") 102 includes a number of micro-mirrors. The state of each micro-mirror of the MEMS arrays 102 can be controlled by applying a voltage between two electrodes associated with each mirror in the MEMS array 102. For example, by rotating the mirrors in the MEMS arrays 102 about two perpendicular axes, light from any fiber coupled to the first collimator 110-1 can be coupled to any fiber coupled to the second collimator 110-2. Accordingly, it is advantageous for the correct functioning of the OCS 100A to have the position of mirrors of the MEMS array 102 to be precisely monitored and controlled, for example, by a processor 140. The processor 140 can be a general purpose processor, a microcontroller, or any other processor that is programmable to monitor and control the position of the mirrors of the MEMS array 102.

The OCS 100A utilizes two injectors (e.g., 120-1 and 120-2), and a camera system 130, including cameras 130-1 and 130-2 for monitoring the position of the mirrors of the MEMS arrays 102. In one or more aspects, each injector 120 is an 850 nm laser that can shine a number (e.g., between about 128 and 1000) of small collimated beams (referred to herein as beamlets) on each of the MEMS mirrors. The 850 nm beamlets from the injectors 120 are transmitted through the first dichroic beam combiner 114-1. The 1310 nm input light from the first collimators 110-1 are reflected from the first dichroic beam combiner 114-1. The combined 850 nm injector beamlets and 1310 nm collimator light is reflected from the MEMS mirror array 102-1 onto a dichroic beam splitter 112. At the dichroic beam splitter 112, the transmitted 850 nm injector beamlets are directed to the camera 130-2 and the reflected 1310 nm collimator light is directed to the MEMs mirror arrays 102-2. A second dichroic beam combiner 114-2 allows the 850 nm beamlets generated by the injector 120-2 to be transmitted to the MEMs mirror array 102-2, while reflecting the 1310 nm light originating from collimator 110-1 to the second collimator 110-2. When the input light is coming from the second collimator 110-2, the roles of the combiners 114-1 and 114-2 are interchanged. The images formed by the camera system 130 are the images of the beamlets emitted by the injectors 120 reflected from the mirrors of the MEMS arrays 102 that are used to measure the mirror positions. Optical performance characteristics of the camera image include good peak separation between the beamlets in the array, suppression of background light, brightness uniformity across the array, and insensitivity to changes in incidence angle. Further, the camera system preferably is manufacturable in substantially high volume, low cost, and environmentally robust to high temperature (e.g. up to about 150 degrees C.), and humidity (e.g., up to about 95% relative humidity). For the camera (e.g., 130) to achieve the above-mentioned performance characteristics, a significant challenge is to design and manufacture a suitable camera imaging screen that has some or all of the above-mentioned desired characteristics. The subject technology, in some implementations, can provide such an imaging screen as described in more detail herein.

FIG. 1B depicts an example imaging screen assembly 100B of the camera system 130. The imaging screen assembly 100B includes an imaging screen 150 (e.g., 132 of FIG. 1A) bonded to a housing 160 (e.g., a stainless steel housing) using a glass (e.g., a soda lime float glass) material 152. The imaging screen 150 includes a ceramic diffuser layer fused into a glass substrate. The thickness of the ceramic diffuser layer after thermal processing is within a range of about 7-10 µm.

In some implementations, the ceramic diffuser layer, before the thermal processing, comprises a printed layer comprising ink material, including a bismuth oxide-based glass frit and oxide-based pigments. The imaging screen includes the printed layer fused into the glass substrate after, for example, drying and kiln firing at a temperature within the range of 650-700 degrees C. The glass substrate can include soda-lime float glass, and the thermal expansion coefficient (CTE) of the ceramic diffuser layer can have a value that is within a range of about 8-10% (e.g., 8.4%) of the CTE value of the glass substrate. The soda-lime float glass has a CTE value within about 5-7% (e.g. 6.7%) of the CTE value of the stainless steel housing.

Figure 2A:
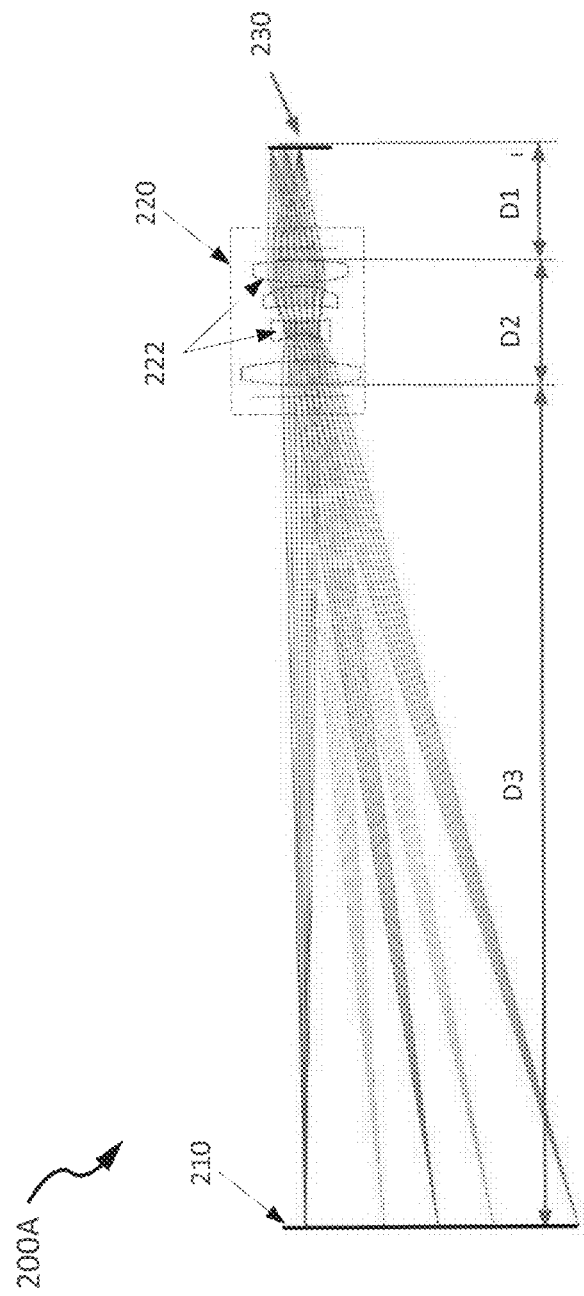
FIGS. 2A-2C are diagrams illustrating an example of a camera and examples of images of the camera system, in accordance with one or more aspects of the subject technology.
Figure 2B:
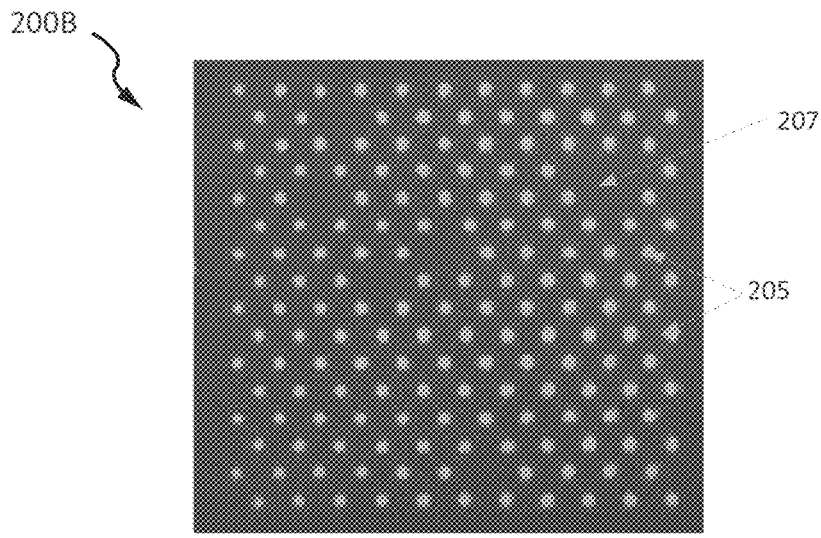
Figure 2C:
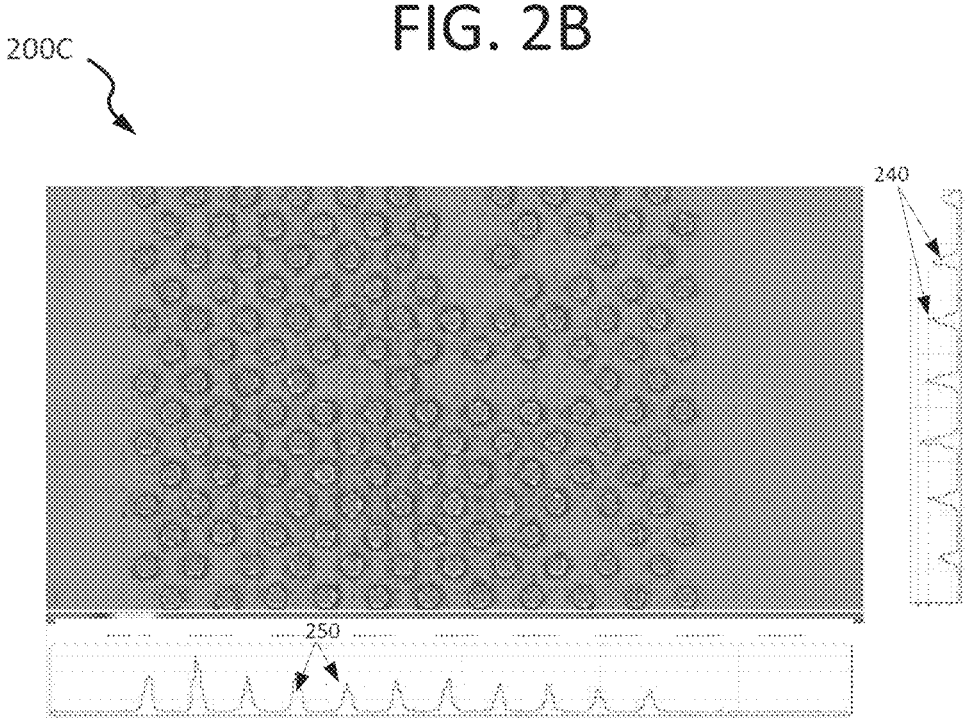

FIGS. 2A-2C are diagrams illustrating an example of a camera 200A and examples of images 200B and 200C of the camera system 130 of FIG. 1A, in accordance with one or more aspects of the subject technology. The camera 200A includes an imaging screen 210, an optical module (e.g., a lens system) 220, and an image sensor 230 mounted together in a metallic (e.g., stainless steel) housing. The respective distances between the image sensor 230, the optical module 220, and an imaging screen 210 are shown as D1, D2, and D3. Example ranges of values for distances D1, D2, and D3 are about 9-10 mm, about 10-11 mm, and about 71-72 mm, respectively. The optical module 220 includes a number of lenses 222 and is suitably designed to focus the light passing through the imaging screen 210 onto the image sensor 230. In some aspects, the lens system of the optical module 220 has a focal length within the range of about 7-9 mm and an F-number within the range of about F/2 to F/3, and is comprised of four individual high index glass lenses mounted with epoxy, similar to epoxy 152 of FIG. 1B, to a stainless steel housing, which is the same as, a part of, or coupled to the housing 150 of FIG. 1B. In some implementations, the camera lens magnification is about −0.112, which allows 1 pixel (e.g., within the range of about 5-7 µm) of the CMOS sensor (e.g., 230) to be illuminated by the light from a spot within the range of about 50-60 µm of the imaging screen (e.g., 210).

In some implementations, the image sensor 230 is a CMOS image sensor known to a person having ordinary skill in the art. In some implementations, the CMOS sensor has a pixel size of a few (e.g., about 5 to about 7, e.g., 6) am, and is attached to a printed circuit board assembly (PCBA) (e.g., 134 of FIG. 1). The CMOS image sensor can be coupled to the processor 140 of FIG. 1 that can process an output signal of the CMOS image sensor to determine positions of mirrors of a MEMS array, such as the MEMS array 102 of the OCS 100A of FIG. 1A. The processor 140 can be a general purpose processor, a microcontroller, or any other processor that is programmable to process the output signal of the CMOS image sensor and, based on these signals, facilitate controlling the position of the mirrors of the optical circuit switch (e.g., OCS 100A).

The imaging screen 210 is a diffuser layer, disclosed herein in more detail, which in some implementations, is suitably designed and manufactured with features satisfying or surpassing some or all of the above-mentioned performance characteristics. In some implementations, the diffuser of the subject technology is a ceramic-printed-on-glass diffuser, which can offer one or more of the desired beamlet peak separation, suppression of background light, uniform brightness across the array, insensitivity to incidence angle, low cost, environmental durability, and manufacturability. The ceramic-printed-on-glass diffuser can be fabricated on a glass substrate (e.g., soda lime float glass substrate) with starting dimensions in the range of about 300 mm×300 mm to 310 mm×310 mm and a thickness within a range of about 3-4 mm. The printed ceramic material can be a white ink containing a bismuth based glass frit and an inorganic white pigment with main components including silicon dioxide (SiO2), zinc oxide (ZnO), diboron trioxide (B2O3), sodium oxide (Na2O), and bismuth oxide (BiO2).

The ink can be applied wet by a printer and then dried. In some implementations, the dried ink can be kiln fired at a temperature within the range of about 650-700 degrees C. to form a hard ceramic layer, which is fused to the glass substrate. In some aspects, the ink has a thickness within the range of about 35-45 µm when applied wet and is within the range about 10-14 µm, e.g., about 12 µm thick after drying. After kiln firing, the final thickness of the ceramic diffuser can be within the range of about 7-10 µm. The CTE of the ceramic diffuser after kiln firing has a value of about 8.5+/−0.3 ppm/K, which is well matched (e.g., within about 8.4%) to the CTE of soda lime float glass substrate (e.g., about 9.28 ppm/K), and the glass substrate is less than about 6.7% different from CTE of the stainless steel housing (9.9 ppm/K). In some implementations, multiple diffusers are printed onto a larger glass plate, which is then thinned, polished, and diced into squares with approximate dimensions within the range of 33 mm×33 mm×1.3 mm to 37 mm×37 mm×1.7 mm to create the final ceramic diffusers.

The disclosed fired ceramic-on-glass layer of the subject technology is substantially environmentally robust and may withstand exposure to high temperatures (e.g., about 150 degrees C.), humidity (e.g., up to about 95% relative humidity), and exposure to boiling water, ultraviolet light, and chemicals. The camera images using the ceramic diffuser of the subject technology can have a desired beamlet peak separation and suppression of background light, uniform (e.g., within 5%) brightness across the array, and insensitivity to incidence angles.

The image 200B shown in FIG. 2B is an image on the CMOS image sensor 230, as viewed on a video monitor. The image 200B includes spots 205, each of which depicts an image of a beamlet directed onto one of the MEMS mirrors in one of the mirror arrays 102. The blank spaces 207 may identify one or more MEMs mirrors that are non-functional.

The image 200C depicted in FIG. 2C shows an example image taken by the camera system 130 of FIG. 1A. The image 200C is a partial image, zoomed in to look at intensity profiles of individual beamlets and shows, along its right and bottom borders, optical signals from the CMOS image sensors (e.g., 230 of FIG. 2A) including peaks such as 240 and 250. The positions of the peaks (e.g., centroid peak positions such as 240 and 250) are important to be kept stable with variation of the environmental conditions such as temperature and humidity. As explained above, the environmental conditions can adversely affect the functionality of a diffuser layer, if not suitably designed and manufactured. A non-stable centroid peak position in the CMOS image signal can be an indication of deterioration of the diffuser layer of the imaging screen. The stable centroid peak positions as shown in the image 200B are an indication overall stability of the opto-mechanical system which can be affected by the high quality of the ceramic diffuser layer of the subject technology.

Figure 3:
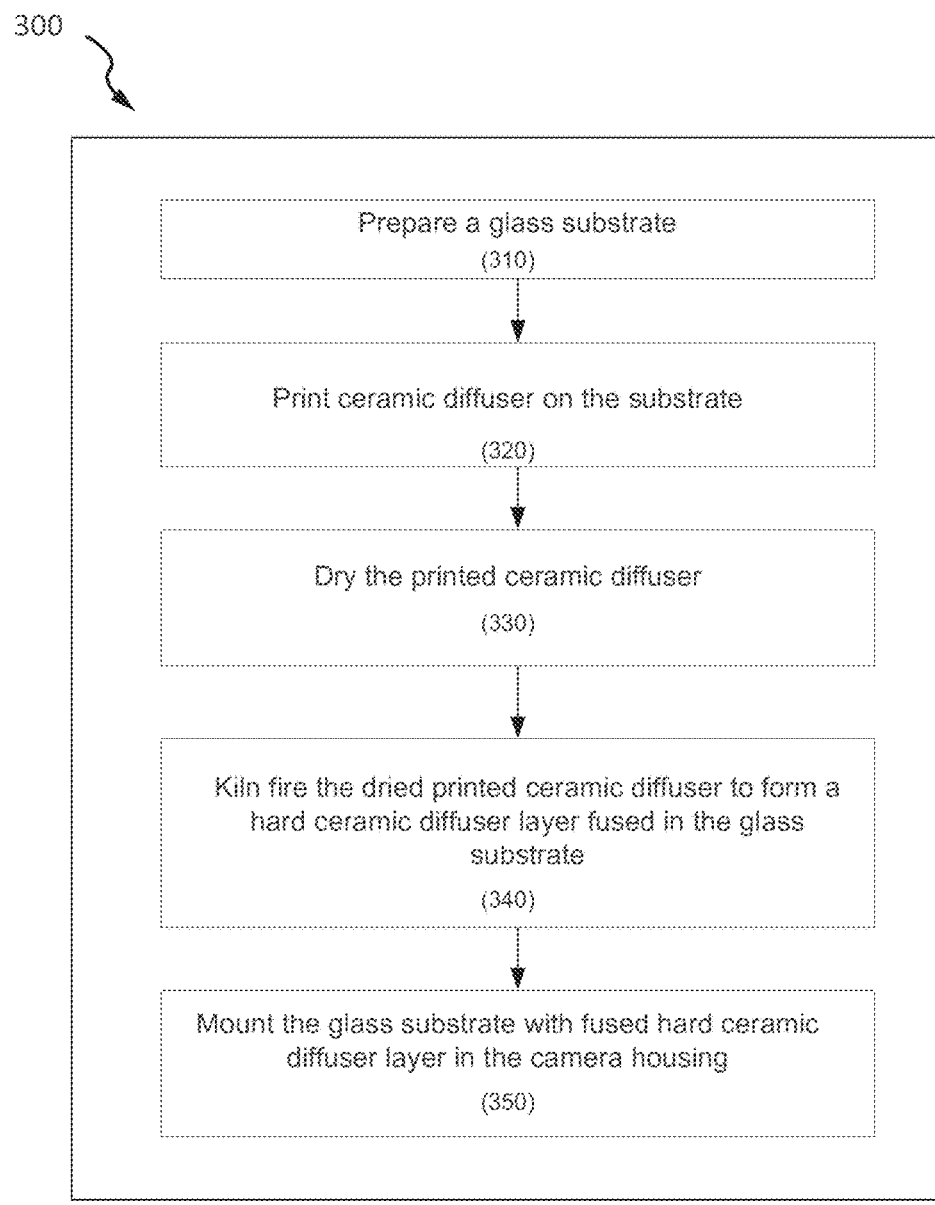
FIG. 3 is a flow diagram illustrating an example method of manufacturing an imaging screen of the camera system of FIG. 2A, in accordance with one or more aspects of the subject technology.

FIG. 3 is a flow diagram illustrating an example method 300 of manufacturing an imaging screen of the camera system 130 of FIG. 1A, in accordance with one or more aspects of the subject technology. The method 300 begins with preparing a glass substrate (310), for example, a soda lime float glass substrate with starting dimensions of about 230 mm×230 mm with a suitable thickness (e.g., within a range of about 3-4 mm). In some aspects, the surface flatness of the glass substrate can be characterized by a peak-to-valley value of about $\lambda/4$ at a wavelength ($\lambda$) of about 633 nm.

The ceramic diffuser is then printed on the substrate (320). In some implementations, the printed ceramic material can be a white ink including a bismuth-based glass frit and an inorganic white pigment with main components including silicon dioxide (SiO2), zinc oxide (ZnO), diboron trioxide (B2O3), sodium oxide (Na2O), and bismuth oxide (BiO2). The printed ceramic layer is dried using conventional methods (330).

In the next step, the dried ceramic diffuser layer is kiln fired at about 670 degrees C. to form a hard ceramic layer, which is fused into the glass substrate (340). The glass substrate with the kiln fired ceramic diffuser layer is ready to be mounted along with the lens system (e.g., 220 of FIG. 2A) and the CMOS image sensor (e.g., 230 of FIG. 2A) in a housing (e.g., stainless steel housing) (350).

While this specification contains many specific implementation details, these should not be construed as limitations on the scope of any inventions or of what may be claimed, but rather as descriptions of features specific to particular implementations of particular inventions. Certain features that are described in this specification, in the context of separate implementations, can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described components and systems can generally be integrated together in a single product or packaged into multiple products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements. Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

What is claimed is:

1. An apparatus comprising:
an imaging screen configured to diffuse incoming light; and
a lens system coupled to the imaging screen and configured to focus light from the imaging screen onto a CMOS image sensor, wherein:
the imaging screen comprises a ceramic diffuser layer directly fused into a surface of a glass substrate such that no gap exists between the ceramic diffuser layer and the glass substrate, and
a thickness of the ceramic diffuser layer is within a range of about 7-10 μm.

2. The apparatus of claim 1, wherein the ceramic diffuser layer comprises a bismuth-based glass frit and at least one inorganic pigment, including one of silicon dioxide (SiO2), zinc oxide (ZnO), diboron trioxide (B2O3), sodium oxide (Na2O), and bismuth oxide (BiO2).

3. The apparatus of claim 1, wherein a thermal expansion coefficient (CTE) of the ceramic diffuser layer has a value within about 8% of a CTE value of the glass substrate.

4. The apparatus of claim 1, further comprising a stainless steel housing coupled to and surrounding the imaging screen using a glass layer including a soda lime float glass material.

5. The apparatus of claim 4, wherein a thermal expansion coefficient (CTE) of the ceramic diffuser layer has a value within about 10-20% of a CTE value of the stainless steel housing, and wherein a CTE value of the glass substrate is within about 6-7% of the CTE value of the stainless steel.

6. The apparatus of claim 1, wherein the imaging screen is configured to be thermally stable within a predefined operating temperature range to enable thermal stability of pixel-to-pixel separation of an image formed on the CMOS image sensor.

7. The apparatus of claim 1, further comprising a processor coupled to the CMOS image sensor, wherein the processor is configured to process an output signal of the CMOS image sensor to determine positions of respective mirrors of an array of MEMS mirrors of an optical circuit switch.

8. The apparatus of claim 1, wherein the glass substrate comprises a soda lime float glass substrate, and wherein the soda lime float glass substrate comprises a low-iron glass substrate.

9. The apparatus of claim 1, wherein surface flatness of the glass substrate is characterized by a peak-to-valley value of about $\lambda/4$ at a wavelength ($\lambda$) of about 633 nm.

10. A camera system for monitoring micro electro-mechanical system (MEMS) mirrors, the camera system comprising:
a diffuser comprising a ceramic diffuser layer directly fused into a first surface of a glass substrate such that no gap exists between the ceramic diffuser layer and the glass substrate;
an optical block configured to concentrate light emitted by the diffuser;
an image sensor configured to receive concentrated light from the optical block and to generate electrical signals; and
a processor coupled to the image sensor and configured to produce an image of beams reflected from the MEMS mirrors based on the electrical signals,
wherein a thermal expansion coefficient (CTE) of the ceramic diffuser layer has a value within about 8% of a CTE value of the glass substrate.

11. The camera system of claim 10, wherein a thickness of the ceramic diffuser layer is within a range of about 7-10 μm.

12. The camera system of claim 10, wherein the ceramic diffuser layer comprises a bismuth-based glass frit and at least one inorganic pigment, including one of silicon dioxide (SiO2), zinc oxide (ZnO), diboron trioxide (B2O3), sodium oxide (Na2O), and bismuth oxide (BiO2).

13. The camera system of claim 10, further comprising stainless steel housing coupled to and surrounding the diffuser using a glass layer including a soda lime float glass, and wherein a thermal expansion coefficient (CTE) of the ceramic diffuser layer has a value within about 10-20% of a CTE value of the stainless steel housing, and wherein a CTE value of the glass substrate is within about 6-7% of the CTE value of the stainless steel.

14. The camera system of claim 10, wherein the image sensor is coupled to the processor and comprises a CMOS image sensor with pixel size of about 6 μm.

15. The camera system of claim 10, wherein the processor is configured to process the electrical signals to determine positions of respective mirrors of an array of MEMS mirrors of an optical circuit switch.

16. The camera system of claim 10, wherein the diffuser is configured to be thermally stable within a predefined operating temperature range to enable thermal stability of pixel-to-pixel separation of an image of the beams reflected from the MEMS mirrors.

17. The camera system of claim 10, wherein the glass substrate comprises a low-iron soda lime float glass substrate.

18. The camera system of claim 10, wherein the optical block comprises a plurality of lenses configured to have a negative magnification and to concentrate lights from a diffuser spot with a size of about 54 μm into an image sensor pixel of about 6 μm.

19. The camera system of claim 10, wherein a thickness of the glass substrate is within a range of about 3-4 mm.

20. The camera system of claim 10, wherein the glass substrate has a surface flatness characterized by a peak-to-valley value of about $\lambda/4$ at a wavelength ($\lambda$) of about 633 nm.

* * * * *